United States Patent [19]

Mizutani et al.

[11] Patent Number: 5,509,786
[45] Date of Patent: Apr. 23, 1996

[54] THERMAL PROTECTOR MOUNTING STRUCTURE FOR HERMETIC REFRIGERATION COMPRESSORS

[75] Inventors: Yasukazu Mizutani; Shigeo Kimura, both of Nagoya; Hideki Koseki, Aichi, all of Japan

[73] Assignee: Ubukata Industries Co., Ltd., Nagoya, Japan

[21] Appl. No.: 81,176

[22] Filed: Jun. 25, 1993

[30] Foreign Application Priority Data

Jul. 1, 1992 [JP] Japan ................................. 4-197858
Apr. 26, 1993 [JP] Japan ................................. 5-123507

[51] Int. Cl.⁶ .............................. F04B 49/10; H02H 5/04
[52] U.S. Cl. ................................ 417/32; 417/18; 361/26
[58] Field of Search ...................... 417/18, 32; 361/26

[56] References Cited

U.S. PATENT DOCUMENTS

| | | | |
|---|---|---|---|
| 1,987,725 | 1/1935 | Veinott | 361/26 |
| 2,279,214 | 4/1942 | Veinott | 361/26 |
| 2,313,969 | 3/1943 | Riche | 361/26 |
| 2,324,161 | 7/1943 | Holmes | 361/26 |
| 2,338,515 | 1/1944 | Johns | 361/26 |
| 2,369,986 | 2/1945 | Schaefer | 361/26 |
| 2,771,528 | 11/1956 | Moran | 361/26 |
| 2,909,719 | 10/1959 | Dubberley | 361/26 |
| 3,023,350 | 2/1962 | Broadley et al. | 361/26 |
| 3,200,274 | 8/1965 | Munier | 361/26 |
| 4,092,573 | 5/1978 | D'Entremont | 361/26 |
| 4,376,296 | 3/1983 | Senor | 337/104 |
| 4,748,531 | 5/1988 | Ortiz | 361/26 |
| 4,791,329 | 12/1988 | Ubukata et al. | |
| 5,021,915 | 6/1991 | Wandler et al. | 361/26 |
| 5,023,744 | 6/1991 | Hofsass | 361/26 |
| 5,118,260 | 6/1992 | Fraser, Jr. | 417/18 |
| 5,200,872 | 4/1993 | D'Entremont et al. | 417/32 |

FOREIGN PATENT DOCUMENTS

| | | |
|---|---|---|
| 52-6801 | 2/1977 | Japan . |
| 59-67853 | 4/1984 | Japan . |
| 62-296739 | 12/1987 | Japan . |
| 63-10763 | 1/1988 | Japan . |

*Primary Examiner*—Richard A. Bertsch
*Assistant Examiner*—Xuan M. Thai
*Attorney, Agent, or Firm*—Foley & Lardner

[57] ABSTRACT

A structure for mounting a thermal protector in a hermetic refrigeration compressor including an electric motor and a compressing means enclosed in a housing with refrigerant is disclosed. The housing has at least one through hole. The structure includes a terminal assembly airtightly secured in the hole of the housing. The terminal assembly includes a metal base and a plurality of electrically conductive terminal pins secured to the metal base by an electrically insulative material with small thermal conductivity. The structure further includes a thermal protector including a hermetic casing, a thermally responsive element disposed in the casing to be in direct contact with an inner wall of the casing at one side, and a contact mechanism. The thermal protector is mounted on a plurality of connection terminals connected to respective ends of the terminal pins located inside the compressor housing so as to be subjected to heat from at least one of the motor, compressing means and the refrigerant, so that the thermal protector is positioned to occupy a predetermined position.

20 Claims, 7 Drawing Sheets

5,509,786

THERMAL PROTECTOR MOUNTING STRUCTURE FOR HERMETIC REFRIGERATION COMPRESSORS

BACKGROUND OF THE INVENTION

1. Field of the Invention

This invention generally relates to a thermal protector for a hermetic refrigeration compressor having a housing in which an electric motor and a compressing means are enclosed with refrigerant gas flowing therein, and more particularly to a structure for mounting the thermal protector responsive to heat generated from the motor or the compressing means in an abnormal condition to cut off the motor current.

2. Description of the Prior Art

Hermetic refrigeration compressors have conventionally been incorporated with a bimetal protector device, for example, for protecting a motor and the like against overheating of the motor, compressor or the like in an abnormal condition. The protector device is mounted on an outer wall of an enclosed housing of the compressor or closely banded together with coils of the motor by strings, as is well known in the art.

Japanese Published Utility Model Application (Kokoku) No. 52-6801 (1977) discloses a protective relay which is screwed into a hole formed in an enclosed housing so as to be engaged with a coil end of the motor. Japanese Published Utility Model Application (Kokai) No. 63-10763 (1988) discloses an overload protector inserted in a hole formed at the motor side of the housing to be airtightly secured therein. Japanese Published Patent Application (Kokai) No. 59-67853 (1984) discloses a protector provided between an airtight terminal assembly and an electric motor in a hermetic housing. Japanese Published Patent Application (Kokai) No. 62-296739 (1987) discloses an internal protector enclosed in a socket mounted on an airtight casing.

The above-mentioned prior art references have the following problems. That is, the closed housing is formed from a metal in the construction that the protector is mounted on the outer wall of the airtight housing or that the overload protector is airtightly secured into the housing. Accordingly, since the thermal conductivity of the enclosed housing is relatively large, heat accumulated in the housing wall is radiated as the result of its contact with outside air and the like. Consequently, since heat induced in the housing is absorbed by the housing wall before reaching the protector, the response of the protector to the heat is retarded. Thus, it takes much time for the temperature increase in the housing to be transmitted to the protector and accordingly, a sufficient protecting operation cannot be expected against sudden or steep temperature increase.

In the construction that the protector is banded together with the motor coils by the strings, sheathing for electrical insulation from the coils is necessitated. Consequently, mounting the protector is troublesome. Furthermore, heat is absorbed into the coils in an abnormal condition of the compressor wherein the temperature of the compressing means exceeds that of the motor coils. In this case, the thermal responsiveness of the protector is lowered. Even when the temperature is increased such that the refrigerant is deteriorated, transmission of the heat to the thermal protector causes a certain time lag.

In the construction that the protector is provided between the airtight terminal assembly and the electric motor, a sufficient insulation distance is required among parts of the protector in order that the motor is directly controlled by the protector. Consequently, it is difficult to render the protector small-sized.

Furthermore, in the construction that the internal protector is enclosed in the socket, an exclusive or dedicated socket needs to be provided and the thermal responsiveness of the protector is lowered by the socket having a certain heat insulation.

Furthermore, in the above-mentioned protector responsive to both the temperature and the overcurrent, its construction is complicated and accordingly, it is difficult to render the protector small-sized.

SUMMARY OF THE INVENTION

Therefore, an object of the present invention is to provide an improved thermal protector mounting structure for the hermetic refrigeration compressor wherein the thermal protector is easily mounted and quickly responsive to abnormal temperature rise in the motor, compressing means or refrigerant gas to cut off the motor current.

The present invention provides an improved thermal protector mounting structure for a hermetic refrigeration compressor having a housing in which an electric motor, a compressing means and a volume of refrigerant gas are provided. The compressor housing has at least one through hole formed in it. The thermal protector mounting structure comprises an airtight terminal assembly secured in the through hole of the compressor housing so that the through hole is airtightly closed by the terminal assembly. The terminal assembly includes a metal base and a plurality of electrically conductive terminal pins secured to the metal base by an electrically insulative material with small thermal conductivity. The structure further comprises a thermal protector comprising a hermetic metal casing-having a withstanding pressure required in the compressor housing, a thermally responsive element disposed in the casing to be approximately parallel to an inner wall of the casing and to be in direct contact with the inner wall so that the thermally responsive element is responsive only to heat transferred thereto from the inner wall of the casing and is unresponsive to a current flowing in the motor, and a switching element disposed in the casing to be responsive to a thermal deformation of the thermally responsive element with a snap action. The thermal protector is mounted on a plurality of connection terminals connected to respective ends of the terminal pins located inside the compressor housing so that the casing thereof is exposed to the refrigerant in the compressor housing, a part of the refrigerant being in contact with the compressing means.

According to the above-described structure, the thermal protector is thermally insulated from the compressor housing by the electrically insulative material employed for securing the terminal pins of the airtight terminal assembly. Consequently, the thermal protector can quickly respond to the abnormal temperature without thermal influence from the compressor housing. Furthermore, since the thermal protector is mounted on the terminal pins of the terminal assembly, the mounting work can be simplified.

The above-described thermal protector has the construction that the thermally responsive element is in direct contact with the inner wall of the casing. Consequently, the ambient heat can be efficiently transferred to the thermally responsive element. Furthermore, the thermally responsive element is in contact with the inner wall of the casing in the state that it is approximately parallel to the wall. Consequently, the thermally responsive element is stable, which can effectively prevent the switching element from chattering because of vibration from the compressing means.

The above-described compressor may preferably include a refrigerant path forming member disposed in the compressor housing. In this regard, the thermal protector may be in contact with a predetermined heating portion of either the compressing means or the refrigerant path forming member. Each connection terminal may be formed from an elastic material such that a contact pressure is applied between the thermal protector and the heating portion. Consequently, the thermal protector can quickly respond to the abnormal heating of the compressing means without influence of a large heat capacity of the compressor housing.

The hermetic refrigeration compressor may further include first control means for controlling the motor, means for supplying a control voltage to a circuit including the thermal protector, the control voltage being lower than a voltage supplied to the motor, and second control means responsive to the thermal protector for controlling first control means. The control voltage applied to the thermal protector is lower than in the type that a power supply circuit of the motor is directly opened and closed. Consequently, the thermal protector can be rendered smallsized with improvement in the thermal responsiveness.

Other objects of the present invention will become obvious upon understanding of the illustrative embodiments about to be described. Various advantages not referred to herein will occur to those skilled in the art upon employment of the invention in practice.

BRIEF DESCRIPTION OF THE DRAWINGS

The embodiments of the invention will now be described with reference to the accompanying drawings, in which.

DESCRIPTION OF THE PREFERRED EMBODIMENTS

Figure 1:
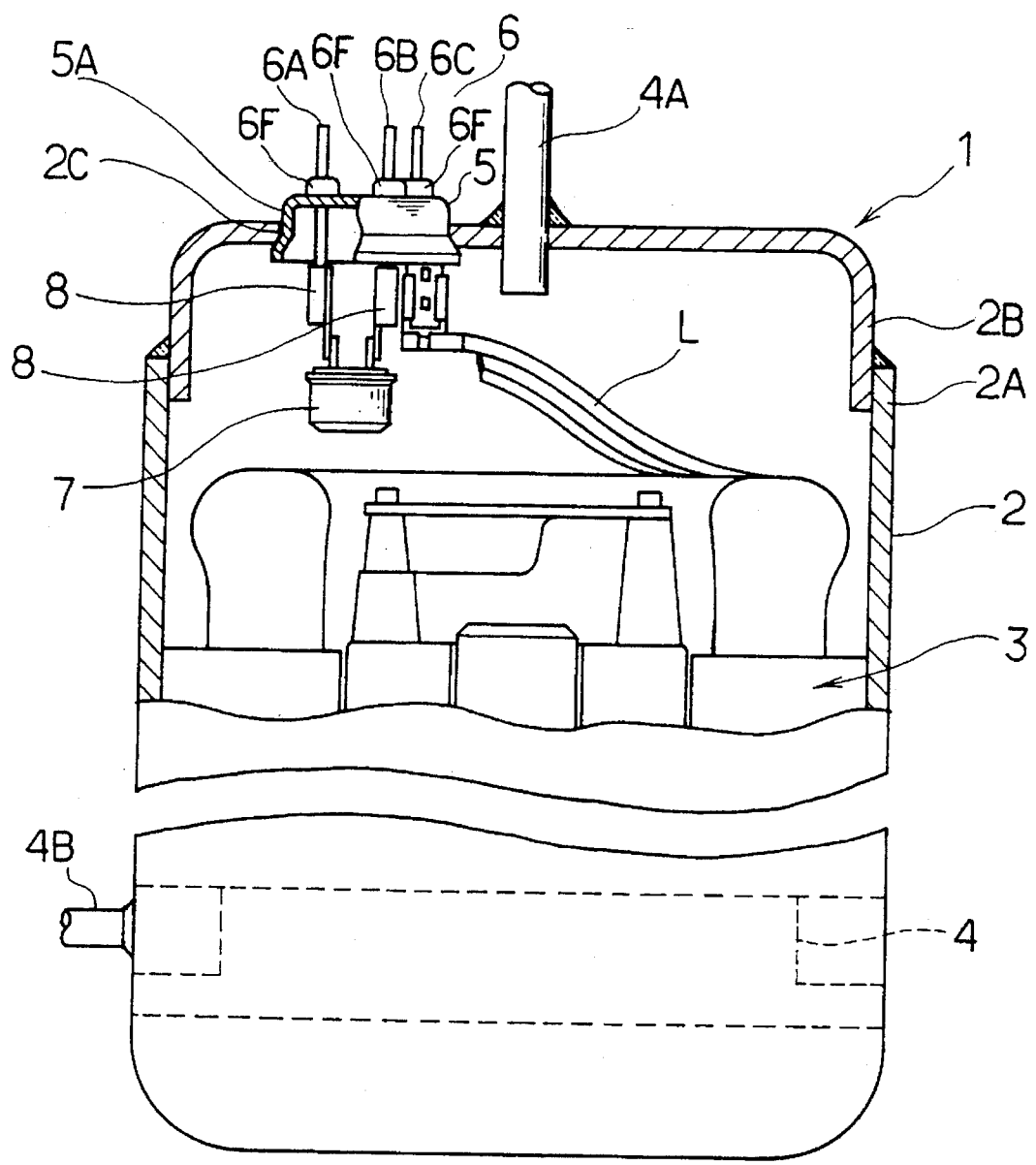
FIG. 1 is a partial longitudinally sectional view of an hermetic refrigeration compressor wherein the thermal protector is mounted in accordance with the thermal protector mounting structure of a first embodiment according to the invention.

A first embodiment of the present invention will be described with reference to FIGS. 1 to 6. FIG. 1 illustrates a hermetic refrigeration compressor on which the thermal protector is mounted in accordance with the thermal protector mounting structure of a first embodiment of the invention. The hermetic refrigeration compressor 1 comprises an enclosed housing 2 including a lower receptacle 2A and a top cover 2B. An electric motor 3 and a compressing means 4 driven by the motor 3 are provided in the housing 2. The hermetic refrigeration compressor 1 is of a so-called high pressure housing type wherein refrigerant delivered from the compressor is circulated to pass through the interior of the housing 2 as its flow path. A discharge pipe 4A airtightly extends through the top cover 2B and a suction pipe 4B extends through the lower receptacle 2A. These pipes are connected to a refrigerating cycle (not shown).

Figure 2:
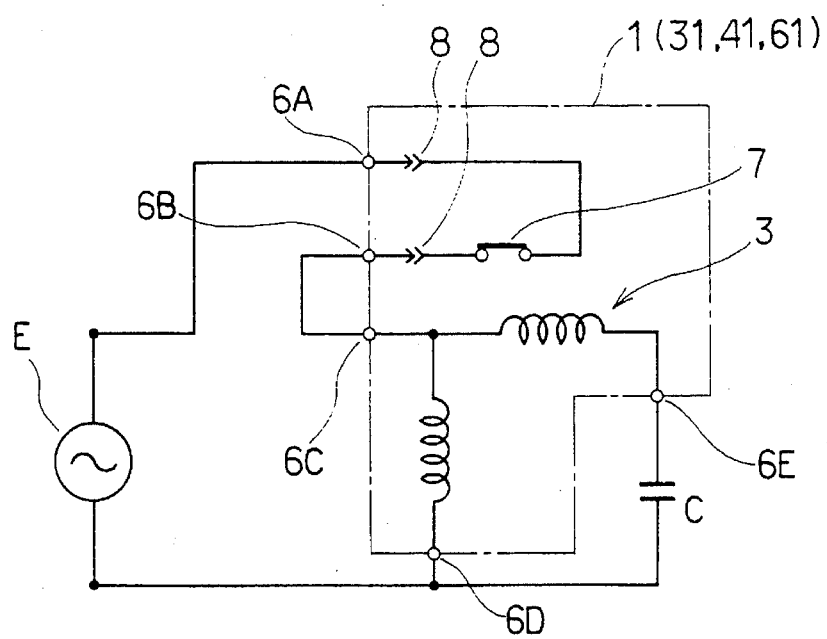
FIG. 2 is a wiring diagram of a motor protecting circuit for the compressor.

The top cover 2B has a through hole 2C. An airtight terminal assembly 5 is airtightly mounted in the hole 2C by way of welding or the like. The terminal assembly 5 has a metal base 5A having a plurality of through holes. A plurality of electrically conductive terminal pins 6 are airtightly fixed in the respective holes of the base 5A by means of an electrically insulating material 6F with small thermal conductivity such as glass or ceramic for the purpose of electrical connection between the inside and outside of the enclosed housing 2. In the embodiment, five such terminal pins 6 are provided and three of them are connected, at inner ends thereof, to coils of the motor 3 via wires L in FIG. 1 in the compressor housing 2, as is well known in the art. Outer ends of these terminal pins 6 are connected to a power source E, a thermal protector which will be described later, and a capacitor C respectively, as is shown in FIG. 2.

The other two terminal pins 6 are connected, at ends inside the housing 2, via connecting pieces 8 to a thermal protector 7 having a metal pressure-resistant hermetically sealed casing. In this regard, the thermal protector 7 is electrically connected to the terminal pins 6 and positioned so as to have a good heat exchange relation between it and a heating element in the enclosed housing 2 or the delivered refrigerant and the motor 3 in the embodiment. Outside ends of these two terminal pins 6 which are connected to the thermal protector 7 at their inside ends are connected to the power source and the terminal pin 6 connected to the motor coils, respectively, as is shown in FIG. 2.

The thermal protector 7 is not operated in a normal condition wherein the temperature of the delivered refrigerant flowing around the thermal protector 7 is below its operative temperature, and accordingly, the motor 3 runs normally.

The motor 3, the compressing means and the like are abnormally heated when the motor 3 is in an overload condition or an abnormal current flows through the circuit, with some cause or other. The heat is transferred to the thermal protector 7 through the refrigerant. In this regard, the heat from the delivered refrigerant can effectively be received by the thermal protector 7 regardless of the temperature of the compressor housing 2 since the thermal protector 7 is thermally insulated from the compressor housing 2 by the electrically insulating material 6F such as glass. When the temperature of the delivered refrigerant exceeds an operative temperature of the thermal protector 7, it operates to cut off the electric path from the power source, thereby interrupting the motor 3.

Figure 3:
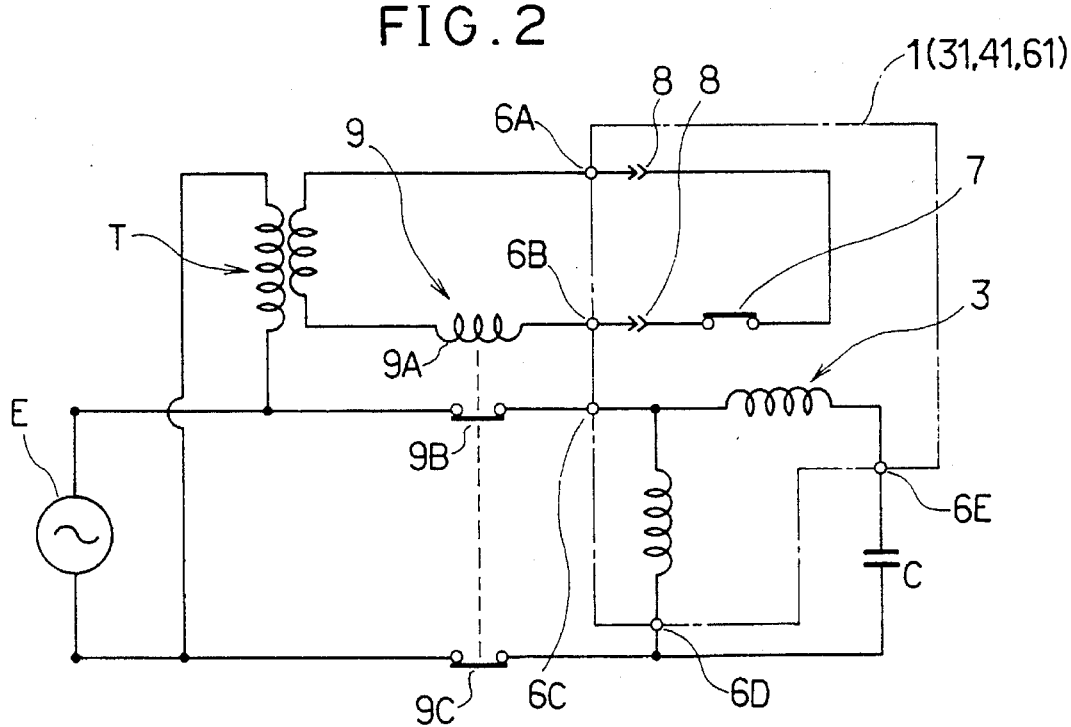
FIG. 3 is a wiring diagram of another motor protecting circuit for the compressor.

A control device such as an inverter, a warning device and the like may be connected to the outer ends of the terminal pins 6A, 6B connected at the inner ends to the thermal protector 7 in order that the motor 3 is interrupted or that a supplied voltage or frequency is changed. In this embodiment, the outer ends of the terminal pins 6A, 6B connected at the inner ends to the thermal protector 7 are connected to a control coil 9A of a relay 9 energizing and deenergizing the motor 3, as is shown in FIG. 3. The outer ends of the terminal pins 6C, 6D, 6E connected at the inner ends to motor 3 are connected to the power source E, the capacitor C and contacts 9B and 9C of the relay 9 respectively. Reference symbol T in FIG. 3 designates a step-down transformer. The electrical circuit connected to the terminal pins 6C, 6D and 6E outside the compressor housing 2 serves as first control means and the electrical circuit connected to the terminal pins 6A and 6B serves as second control means. The terminal pins 6D and 6E are located behind the terminal pins 6B and 6A respectively, as viewed in FIG. 1.

According to the electrical arrangement shown in FIG. 3, the thermal protector 7 is not operated in a normal condition wherein the temperature of the delivered refrigerant flowing around the thermal protector 7 is below its operative temperature, and accordingly, the motor 3 runs normally. Accordingly, no warning is given.

The motor 3, the compressing means 4 and the like are abnormally heated when the motor 3 is in an overload condition or an abnormal current flows through the circuit, with some cause or other. The heat is transferred to the thermal protector 7 via the refrigerant. When the temperature of the delivered refrigerant exceeds an operative temperature of the thermal protector 7, it operates to thereby generate a signal, which is supplied to the control device interrupting the motor 3 or activating the warning device via other contacts (not shown) of the relay 9. It can be easily understood that in the so-called pilot duty system as described above, the above-described thermal protector for a single phase motor can be applied to three-phase induction motors.

The thermal protector 7 will now be described in detail with reference to FIG. 4. The thermal protector 7 comprises a metal casing 11 and a header plate 12 hermetically secured to the casing 11 by way of a ring projection welding or the like so that an enclosed casing with a pressure tightness sufficient to be used in the housing of the hermetic refrigeration compressor is provided. The header plate 12 has through holes in which electrically conductive terminal pins 14A and 14B are airtightly secured by means of an electrically insulating material 13 such as glass. A fixed contact 15 is secured to the end of the terminal pin 14A positioned in the metal casing of the thermal protector. One end of a movable contact support 16 having electrical conductivity and elasticity is secured to the end of the other terminal pin 14B positioned in the compressor housing. A movable contact 17 serving as a switching element with the fixed contact 15 is carried on the other end of the contact support 16 so that the same is engaged with and disengaged from the fixed contact. A pair of connecting pieces 8 are secured to ends of the terminal pins 14A, 14B respectively for the electrical connection and the positioning in connection of the thermal protector to the airtight terminal assembly 5.

A thermally responsive element 18 is disposed on the inner bottom of the casing 11 to be substantially parallel to the inner bottom face of the casing 11. The thermally responsive element 18 is formed of a bimetal into a generally dished shape so that it is usually concave on the inner bottom side of the casing 11. The thermally responsive element 18 is adapted to reverse its curvature with a snap action at a first operative temperature and to return to its former state with the snap action at a second operative temperature. A support 19 is provided so that the central portion of the thermally responsive element 18 is in direct contact with the casing bottom. Consequently, the thermally responsive element 18 is more responsive to the ambient temperature than a conventional thermally responsive switch wherein the thermally responsive element is not in contact with the casing or in contact with only one end thereof. A transmission piece 20 formed from an electrically insulative material such as ceramic is held between the movable contact support 16 and the support 19. The spring constant and the position of the support 19 are determined so that its restoring force takes a suitable value smaller than that of the movable contact support 16. Consequently, the contact pressure between the movable and fixed contacts is maintained at a suitable value so that the lower end of the transmission piece 20 is not always in contact with the thermally responsive element 18. Simultaneously, the thermally responsive element 18 is held to be in a good heat exchange relation with the bottom of the casing 11 without any obstacle to the reversing and returning operations of the thermally responsive element 18.

Figure 4:
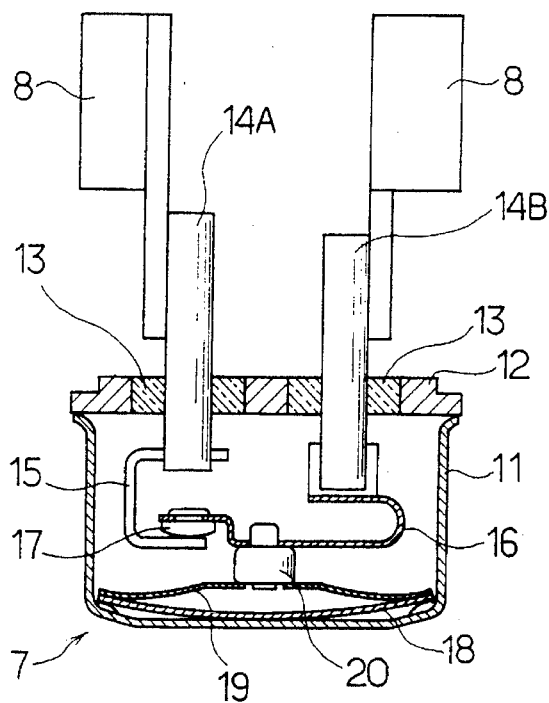
FIG. 4 is a longitudinally sectional view of the thermal protector.

In operation, the thermally responsive element 18 is concave on the inner bottom of the casing 11 when the ambient temperature is below its operative temperature, as is shown in FIG. 4. The thermally responsive element 18 gradually varies its curvature slightly as the ambient temperature rises but the good heat exchange relation is kept between the casing bottom and the thermally responsive element 18 by the supporting force of the support 19. Furthermore, the contact pressure between the movable and fixed contacts is not changed in this while until the time of contact disengagement since the movable contact support 16 suffers no force from the thermally responsive element 18 in FIG. 4. When the ambient temperature exceeds the first operative temperature, the thermally responsive element 18 reverses its curvature with snap action so as to be convex upwardly. The reversed thermally responsive element 18 pushes the movable contact support 16 upwardly via the transmission piece 20 such that the movable contact 17 is disengaged from the fixed contact 15, thereby cutting off the electric path.

Subsequently, the thermally responsive element 18 gradually changes its curvature slightly in the direction that the curvature is reduced but the movable contact 17 is positioned so as not to be brought into contact with the fixed contact 15 until the thermally responsive element 18 returns to its former curvature as the result of drop of the ambient temperature to the second operative temperature. Thus, the thermally responsive element 18 returns to its former curvature with snap action when the ambient temperature drops to its second operative temperature. The curvature of the thermally responsive element 18 then becomes concave on the housing inner bottom and the thermally responsive element 18 departs from the transmission piece 20, as is shown in FIG. 4. The movable contact support 16 pushed upwardly via the transmission piece 20 by the thermally responsive element 18 returns by its elasticity to its former position such that the movable contact 17 is engaged with the fixed contact 15.

In the thermal protector mounting structure as described above, the contact pressure is not reduced immediately before the disengagement of the movable contact 17 from the fixed contact 15. Furthermore, the biasing force of the movable contact support 16 is rendered sufficiently large against the mass of the movable contact 17 and the elasticity of the support 19 so that such a sufficient contact pressure as to prevent the disengagement of the contacts due to the vibration expected at the time of engagement of the contacts can be obtained. The biasing force of the movable contact support 16 is further set so that the engagement of the contacts due to the vibration expected at the time of disengagement of the contacts can be prevented and the operation of the thermally responsive element 18 is not influenced. Consequently, an error in operation of the thermally responsive switch due to chattering resulting from the vibration caused by the enclosed compressor can be substantially eliminated.

According to the above-described embodiment, the thermal protector is mounted on the terminal pins disposed inside the housing of the airtight terminal assembly mounted on the enclosed compressor housing. Accordingly, the thermal protector is responsive to the atmospheric temperature in the compressor housing without influence by the outside atmospheric temperature or ventilating condition, as compared with the conventional enclosed compressor in which the thermal protector is mounted outside the compressor housing. Consequently, the above-described thermal protector can sufficiently follow rapid increase in the atmospheric temperature in the compressor housing. Furthermore, since the terminal pins are secured to the base 5A of the terminal assembly 5 by the electrically insulative material 6F with small thermal conductivity, such as glass, the heat generated in the compressor housing is not absorbed into the housing wall, which can prevent the response of the thermal protector from being retarded.

Furthermore, sheaths for the electrical insulation are necessary in the conventional protector banded integrally with the motor coils. However, such sheaths are not required in the above-described construction and consequently, the thermal protector can be mounted readily as compared with the conventional protector. Furthermore, the thermal protector is disposed so as to be away from peripheral parts in the refrigerant path so that the thermal protector has a good heat-exchange relation to the refrigerant flowing along the motor 3 from the compressing means 4. Consequently, the thermal protector can rapidly respond to an abnormal condition of each heating element.

Figure 5:
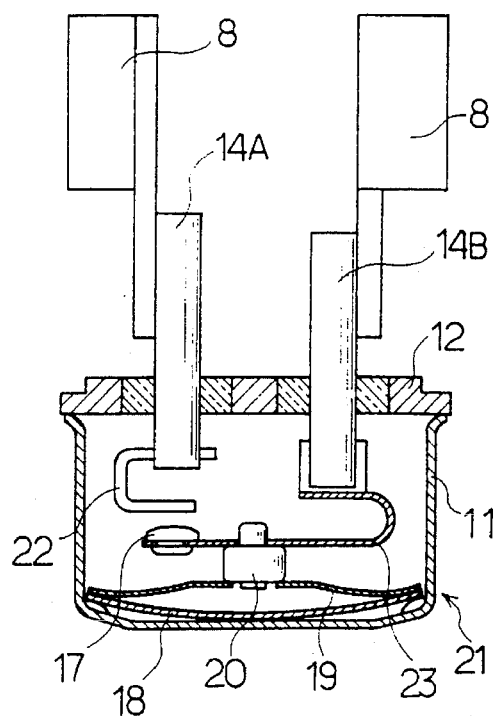
FIG. 5 is a longitudinally sectional view of the thermal protector in another arrangement.

Although the normally closed thermal protector is described in the foregoing embodiment, it may be replaced by a normally open thermal protector as shown in FIG. 5. The same parts as in the foregoing embodiment are labeled by the identical reference numerals and their description will be eliminated. In the thermal protector 21, the movable contact 17 secured to the distal end of the movable contact support 23 is disengaged from the fixed contact 22 secured to the terminal pin 14A below the operative temperature. In the thermal protector 21, too, the relation between the biasing force of the movable contact support 23 and the elasticity of the support 19 is set in consideration of the expected vibration.

In operation of the thermal protector 21, the thermally responsive element 18 is concave on the inner bottom of the casing 11 in FIG. 5 during the normal operation of the enclosed compressor on which the thermal protector is mounted, so that the movable contact 17 is disengaged from the fixed contact. Upon abnormal heat generation due to an overload condition or the like, the thermally responsive element 18 reverses its curvature with a snap action to be thereby convex upwardly in the figure. Consequently, the movable contact support 23 is pushed upwardly, which forces the movable contact support up such that the movable contact 17 is engaged with the fixed contact 22. Subsequently, the thermally responsive element 18 returns to its former state in FIG. 5 with the snap action upon drop in the ambient temperature, whereby the contacts are opened. When the thermal protector 21 is employed in place of the thermal protector 7 in FIG. 3, the contacts 9B, 9C of the relay 9 are of the normally closed type.

Figure 6:
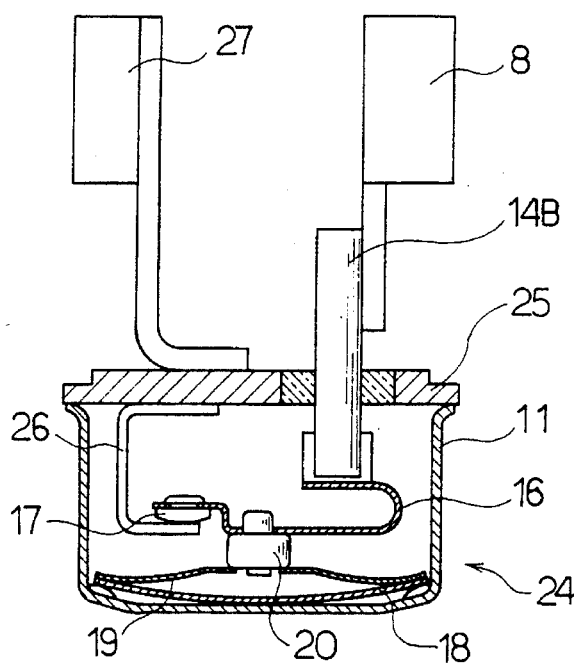
FIG. 6 is a longitudinally sectional view of the thermal protector in further another arrangement.

One of the connection terminals may be secured to the hermetically sealed casing of the thermal protector as shown in FIG. 6 as another modified form. In the thermal protector 24, only the terminal pin 14B is secured through the hole of the header plate 25 of the hermetically sealed casing. The connection terminal 8 and the movable contact support 16 are secured to the terminal pin 14B in the same manner as in the above-described thermal protector 7. One end of the fixed contact 26 engaged with and disengaged from the movable contact 17 is directly secured to the inside of the casing, for example, to the inside of the header plate 25. A connection terminal 27 is directly secured to the outside of the header plate 25. Differing from the abovedescribed thermal protector, the thermal protector 24 has the hermetic casing 11 serving as an electrically charged portion. However, no problems arise when the hermetic casing is mounted so as not to be in touch with any part in the compressor housing and so as to be responsive to the refrigerant temperature, as shown in FIG. 1 or when a power supply voltage is converted by the transformer T to a very low voltage, as shown in FIG. 3. The description of the operation of the thermal protector 24 will be eliminated since it operates in the same manner as in the thermal protector 7.

Furthermore, the compressor employs as the control system the so-called pilot relaying wherein a lower voltage control signal is supplied to the thermal protector 7 than in the arrangement that the power source of the motor 3 is directly cut off. Accordingly, the withstand voltages among the parts of the thermal protector 7 can be set at low values. Consequently, the thermal protector 7 can be further rendered small-sized and the thermal responsiveness of the thermal protector 7 can be improved accordingly. However, the power supply to the motor 3 may be directly cut off when the performance of the thermal protector 7 is sufficient for the motor capacity in FIG. 2.

Figure 7:
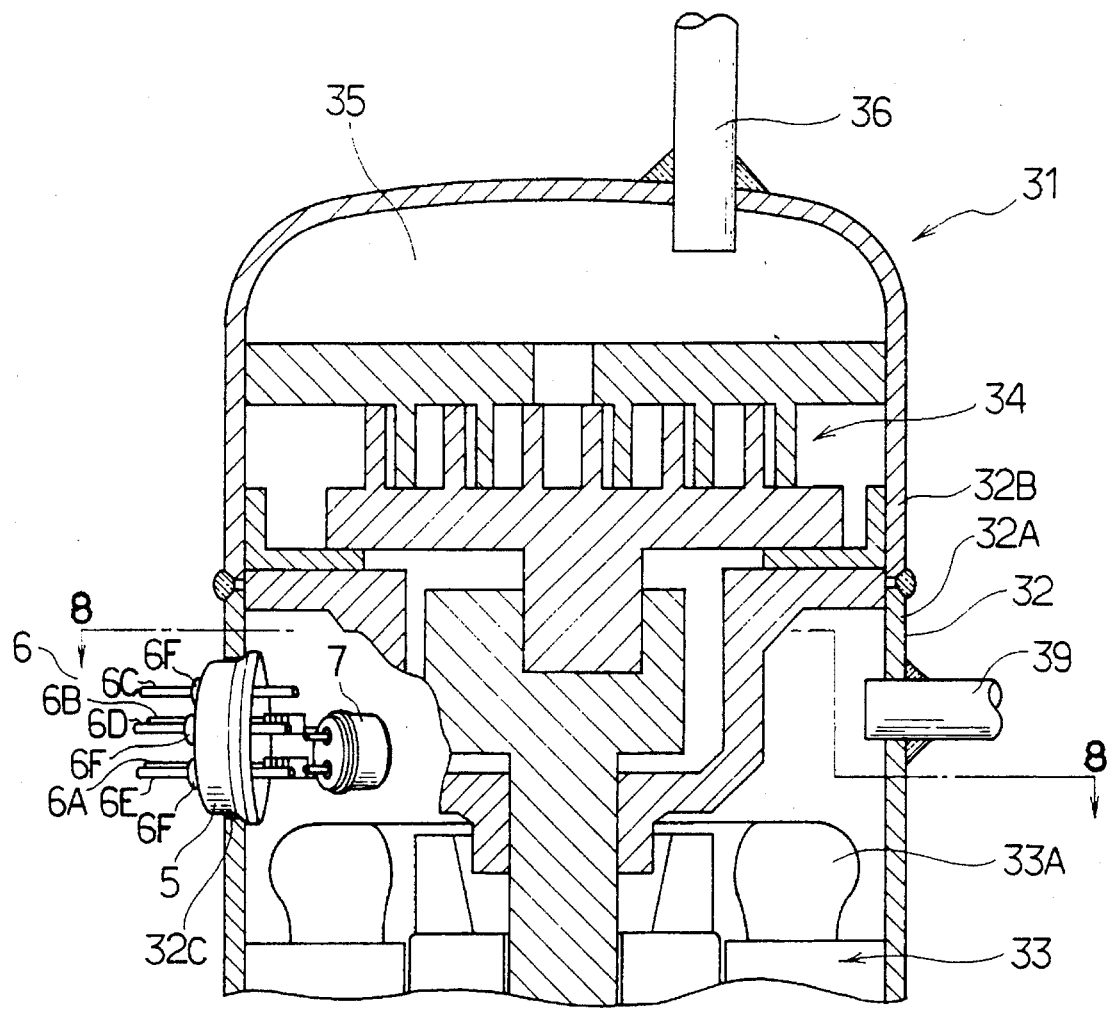
FIG. 7 is a view similar to FIG. 1 showing a second embodiment.
Figure 8:
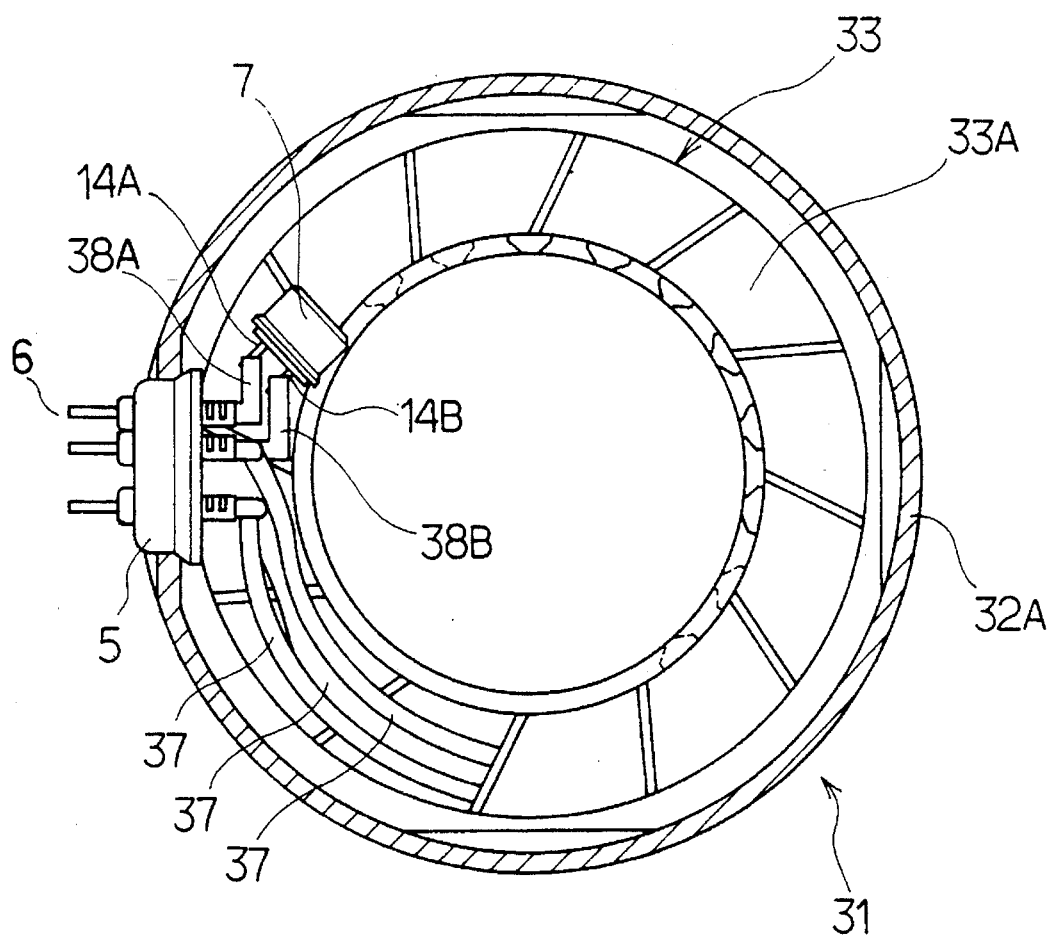
FIG. 8 is a sectional plan view taken along line 8—8 in FIG. 7.

FIGS. 7 and 8 illustrate another embodiment of the invention. FIG. 7 is a partial longitudinally sectional view of the hermetic refrigeration scroll compressor 31 of the low pressure housing type wherein the suction refrigerant is caused to flow into the motor side of the interior of the compressor housing. FIG. 8 is a view taken along line 8—8 in FIG. 7. The hermetic refrigeration compressor comprises a hermetic housing 32 composed of a receptacle 32A and a top cover 32B. The motor 33 and the scroll compressing means 34 are provided in the hermetic housing. A discharge chamber 35 for the refrigerant supplied from the compressing means 34 is defined in the upper interior of the housing 32. The refrigerant is further supplied from the discharge chamber 35 to a heat exchange unit (not shown) via a discharge pipe 36 extending through the top cover 32B and secured in position.

In the second embodiment, the airtight terminal assembly 5 is airtightly secured in the through-hole 32C formed in the receptacle 32A. The terminal assembly 5 has through holes through which five conductive terminal pins 6 are airtightly secured by the insulative material 6F such as glass. The outer ends of three terminal pins 6C, 6D and 6E are connected to the power source and the like in the same manner as in FIG. 2. The inner ends of the terminal pins 6C, 6D and 6E are connected to lead wires 37 of the coils of the motor 33 as shown in FIG. 8. Connection terminals 38A and 38B are secured to the terminal pins 14A, 14B of the thermal protector 7 by way of welding or the like respectively. The connection terminals 38A, 38B are inserted into the inner ends of the other two terminal pins 6A and 6B, whereby the thermal protector 7 is mounted on the terminal pins 6A and 6B to be electrically connected to the terminal pins 6A and 6B and to be in touch only with the refrigerant away from the peripheral parts. The outer ends of the terminal pins 6A and 6B are connected to the coil 9 of the relay and the controlling power source respectively in the same manner as shown in FIG. 3. A refrigerant suction pipe 39 is airtightly provided through the peripheral wall of the receptacle 32A.

In the embodiment, the position of the thermal protector 7 is so biased that it is subjected to the heat from the motor 33. More specifically, the thermal protector 7 is located over the motor coils. Furthermore, the thermal protector 7 is disposed not to be in contact with the motor coils and other parts.

The operation of the enclosed compressor will now be described. The refrigerant sucked in through the suction pipe 39 flows around the motor 33 and then, flows toward the compressing means 34. After the refrigerant is compressed by the compressing means 34, the compressed refrigerant flows into the discharge chamber 35 and is then delivered to the cooling unit (not shown) through the discharge pipe 36. When the refrigerant sucked in through the suction pipe 39 flows around the motor, the heat exchange occurs between them. Since the refrigerant subjected to the heat from the motor 33 flows around the thermal protector 7, it can reliably respond to the overheat of the motor. Furthermore, the responsiveness of the thermal protector can be further improved when it is located closer to the motor 33 or the bottom face of the thermal protector 7 serving as the heat sensing portion is opposed to the end turns of the coil 33A of the motor 33.

Figure 9:
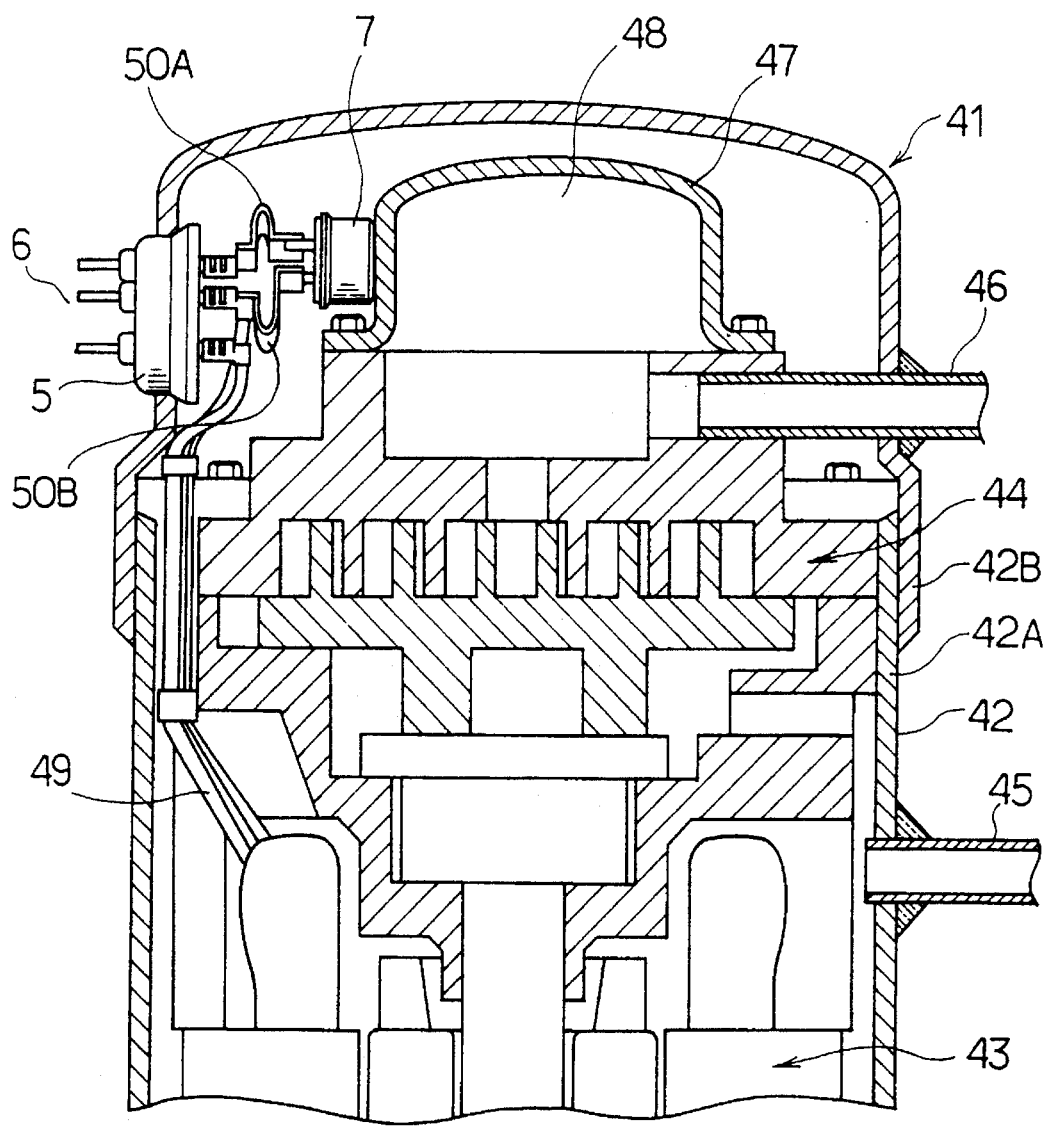
FIG. 9 is a view similar to FIG. 1 showing a third embodiment.

FIG. 9 is a partial longitudinally sectional view of the hermetic refrigeration compressor of a third embodiment. The compressor of the third embodiment is the scroll compressor of the low pressure housing type. The hermetic refrigeration compressor 41 comprises the hermetic housing 42 composed of the receptacle 42A and the top cover 42B. The motor 43 and the scroll compressing means 44 are provided in the housing 42. The refrigerant suction pipe 45 is airtightly provided through the peripheral wall of the receptacle 42A. The discharge pipe 46 is airtightly provided through the peripheral wall of the top cover 42B.

An outlet of the compressing means 44 is airtightly covered by a cover 47, thereby forming the discharge chamber 48. The discharge pipe 46 is connected to the discharge chamber 48 so that the refrigerant discharged from the discharge chamber 48 is directly delivered to the heat exchange unit (not shown) provided outside.

The top cover 42B has a through hole in which the terminal assembly 5 is airtightly secured by way of welding or the like. The terminal assembly 5 has through hole through which five terminal pins 6 are airtightly secured by the insulation material such as glass or the like respectively. The inner ends of three of the terminal pins 6C, 6D and 6E are connected to the lead wires 49 from the motor 43. The outer ends of these three terminal pins 6C, 6D and 6E are connected to the power source and the like in the same manner as shown in FIG. 3. The inner ends of the other two terminal pins 6A and 6B are connected via the connection terminals 50A, 50B to the thermal protector 7. The outer ends of these two terminal pins 6A and 6B are connected to the motor control device such as the coil 9 of the relay and the like in the same manner as shown in FIG. 3.

In the embodiment, the thermal protector 7 closely contacts with a refrigerant path forming member or the cover 47 of discharge chamber 48 serving as a heating portion by means of the connection terminals 50A, 50B each having elasticity so that a reliable relation of heat exchange is obtained between the thermal protector 7 and the cover 47. Accordingly, changes in the temperature of the discharged refrigerant can be reliably sensed even though the terminal assembly is mounted on the low pressure side housing of the enclosed compressor. A contact member having the bottom whose configuration is in accordance with that of bottom of the thermal protector 7 may be mounted on the cover 47 so that the contact area with the bottom of the thermal protector 7 is increased.

When the thermal protector 7 has the construction as shown in FIG. 4, the casing 11 does not serve as an electrically charged portion. In this case, no problem arises if the casing 11 is in contact with the metal parts such as to cover 47. Furthermore, the airtight casing as shown in FIG. 6 may serve as the electrically charged portion when the thermal protector 7 is in contact with the cover 47 with an insulator interposed therebetween or when the conduction between the casing 11 and the other portions causes no problems.

Figure 10:
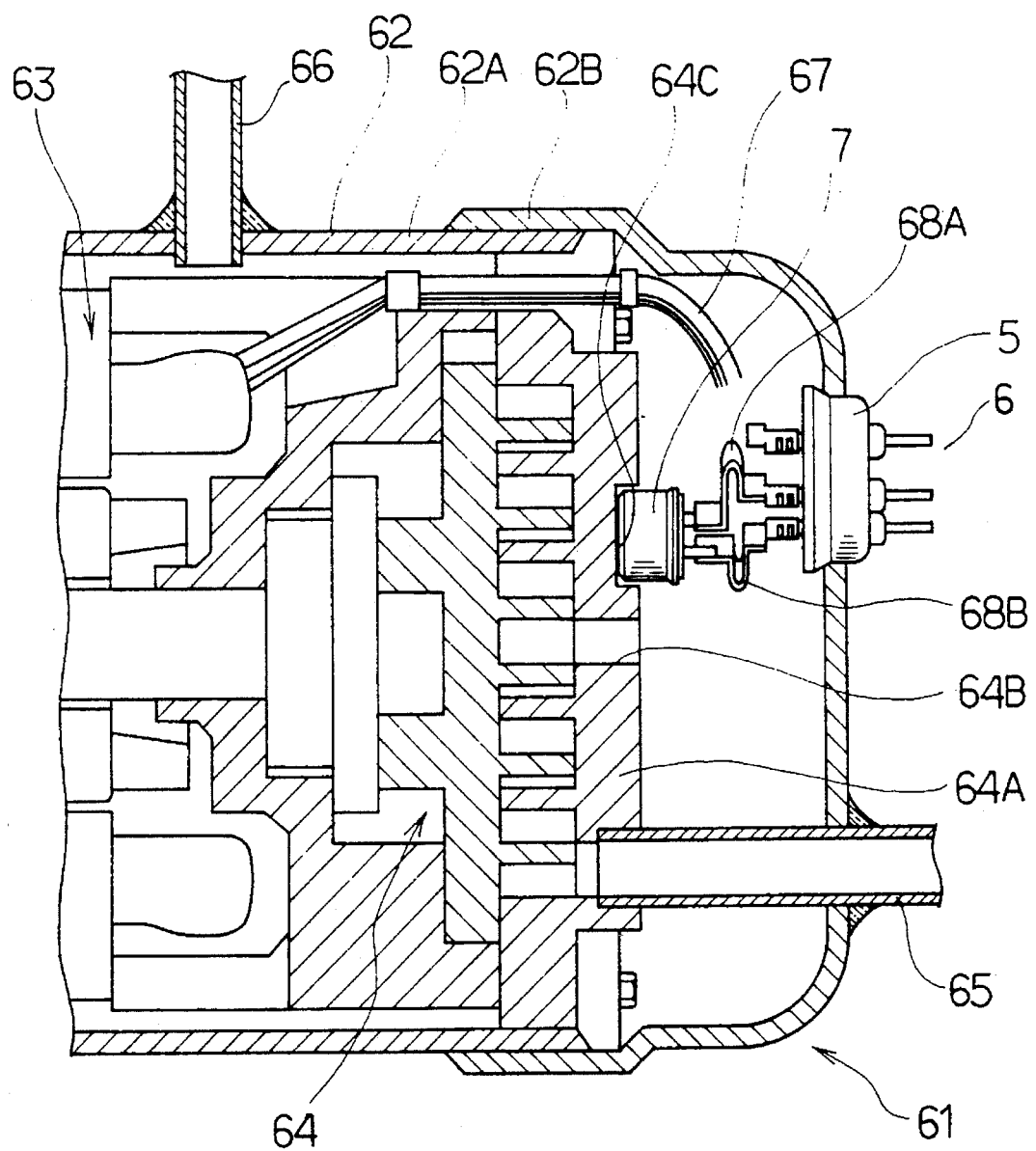
FIG. 10 is a view similar to FIG. 1 showing a fourth embodiment.

A fourth embodiment of the invention will be described with reference to FIG. 10 illustrating the scroll enclosed compressor of the high pressure housing type. The compressor 61 comprises the hermetic housing 62 composed of the receptacle 62A and the top cover 62B. The motor 63 and the scroll compressing means 64 are provided in the housing 62. The refrigerant suction pipe 65 is airtightly provided through the wall of the top cover 62B. The discharge pipe 66 is airtightly provided through the peripheral wall of the receptacle 62A.

The suction pipe 65 is connected to an inlet of the compressing means 64 in a fixed scroll 64A so that the refrigerant is sucked in the compressor from the heat exchanger (not shown) mounted outside. The refrigerant discharged from the outlet 64B of the compressing means 64 flows through the space between the housing wall and the compressing means and motor to be delivered via the outlet pipe 66 to the heat exchanger.

The top cover 62B has a through hole in which the terminal assembly 5 is airtightly secured by way of welding or the like. The terminal assembly 5 has through holes through which five terminal pins 6 are airtightly secured by the insulation material such as glass or the like respectively. The inner ends of three of the terminal pins 6C, 6D and 6E are connected to the lead wires 67 from the motor 63. The outer ends of these three terminal pins 6C, 6D and 6E are connected to the power source and the like in the same manner as shown in FIG. 3. The inner ends of the other two terminal pins 6A and 6B are connected via the connection terminals 68A, 68B to the thermal protector 7. The outer ends of these two terminal pins 6A and 6B are connected to the motor control device such as the coil 9 of the relay and the like.

In the embodiment, the thermal protector 7 is in close contact with a heat sensitive recess portion 64C provided on the fixed scroll 64A of the compressing means 64 for serving as the heating portion, by means of the connection terminals 68A, 68B each having elasticity so that a reliable relation of heat exchange is obtained between the thermal protector 7 and the heat sensitive recess portion 64C. Accordingly, changes in the temperature of the compressing means can be reliably sensed. Although the heat sensitive recess portion 64C is provided on the compressing means 64 so that the reliable heat conduction to the thermal protector 7 is achieved, it may be eliminated when a sufficient heat conduction can be provided otherwise.

In the foregoing embodiments, the connection terminals are secured to the thermal protector by way of welding or the like and inserted into the terminal pins of the terminal assembly. The connection terminals may be secured to the respective terminal pins of the terminal assembly by way of welding or the like and the terminal pins of the thermal protector may be inserted into the respective connection terminals. Furthermore, the connection terminals may be secured to both the terminal pins of the terminal assembly and those of the thermal protector and these connection terminals are inserted into each other. Additionally, the terminal pins of the terminal assembly and those of the thermal protector may be inserted into the connection terminals.

Although the terminal assembly has five terminal pins in the foregoing embodiments, the number of the terminal pins is not limited to five. A terminal assembly having three terminal pins may be used for the power source and another terminal assembly having two terminal pins may be used for the thermal protector.

In the embodiment shown in FIG. 3, the thermal protector is connected via the terminal assembly to the control coil of the relay through which the power is supplied to the motor, so that the power supply to the motor is interrupted in the abnormal condition. Instead, the thermal protector may be connected via the terminal assembly to an electric circuit controlling the power supply voltage, a frequency controllable inverter circuit or an alarm device alarming in the abnormal condition.

The foregoing disclosure and drawings are merely illustrative of the principles of the present invention and are not to be interpreted in a limiting sense. The only limitation is to be determined from the scope of the appended claims.

We claim:

1. A thermal protector mounting structure for a hermetic refrigeration compressor having a housing in which an electric motor, a compressing means and a volume of refrigerant gas are provided, the compressor housing having at least one through hole formed therein, the thermal protector mounting structure comprising:

an airtight terminal assembly secured in the through hole formed in the compressor housing so that the through hole is airtightly closed by the terminal assembly, the terminal assembly including a metal base and a plurality of electrically conductive terminal pins secured to the metal base by an electrically insulative material with small thermal conductivity;

a thermal protector comprising a hermetic metal casing having a withstanding pressure required in the compressor housing, a thermally responsive element disposed in the casing to be approximately parallel to an inner wall of the casing and to be in direct contact with the inner wall so that the thermally responsive element is responsive with a snap action, only to heat transferred thereto from the inner wall of the casing, and a switching element disposed in the casing to be responsive to a thermal deformation of the thermally responsive element; and wherein the thermal protector is mounted inside the compressor housing to a plurality of connection terminals connected to respective ends of the terminal pins so that the casing thereof is exposed to the refrigerant in the compressor housing, a part of the refrigerant being in contact with the compressing means.

2. A structure according to claim 1, wherein the hermetic refrigeration compressor includes a refrigerant path forming member disposed in the compressor housing, the thermal protector is in contact with a predetermined heating portion of one of the compressing means and the refrigerant path forming member, and each connection terminal is formed from an elastic material such that a contact pressure is applied between the thermal protector and the heating portion.

3. A structure according to claim 2, wherein the thermal protector is in contact with the compressing means.

4. A structure according to claim 2, wherein the hermetic refrigeration compressor is of a low pressure housing type and the thermal protector is disposed in a low-pressure region in the compressor housing so as to be in contact with the refrigerant path forming member.

5. A structure according to claim 1, wherein the hermetic refrigeration compressor is of a scroll type.

6. A structure according to claim 2, wherein the hermetic refrigeration compressor is of a scroll type.

7. A structure according to claim 4, wherein the hermetic refrigeration compressor is of a scroll type.

8. A structure according to claim 1, wherein the hermetic casing of the thermal protector is insulated from the switching element disposed in the casing.

9. A structure according to claim 5, wherein the hermetic casing of the thermal protector is insulated from the switching element disposed in the casing.

10. A structure according to claim 7, wherein the hermetic casing of the thermal protector is insulated from the switching element disposed in the casing.

11. A structure according to claim 1, wherein the hermetic refrigeration compressor further includes first control means for controlling the motor, means for supplying a control voltage to a circuit including the thermal protector, the control voltage being lower than a voltage supplied to the motor, and second control means responsive to the thermal protector for controlling the first control means.

12. A structure according to claim 11, wherein the hermetic refrigeration compressor includes a refrigerant path forming member disposed in the compressor housing, the thermal protector is in contact with a predetermined heating portion of one of the compressing means and the refrigerant path forming member, and each connection terminal is formed from an elastic material such that a contact pressure is applied between the thermal protector and the heating portion.

13. A structure according to claim 11, wherein the hermetic refrigeration compressor is of a low pressure housing type and the thermal protector is disposed in a low-pressure region in the compressor housing so as to be in close contact with a refrigerant path forming member communicating with the compressing means.

14. A structure according to claim 11, wherein the hermetic refrigeration compressor is of a scroll type.

15. A structure according to claim 12, wherein the hermetic refrigeration compressor is of a scroll type.

16. A structure according to claim 13, wherein the hermetic casing of the thermal protector is insulated from the switching element disposed in the casing.

17. A structure according to claim 11, wherein the hermetic casing of the thermal protector is insulated from the switching element disposed in the casing.

18. A structure according to claim 14, wherein the hermetic casing of the thermal protector is insulated from the switching element disposed in the casing.

19. A structure according to claim 1, wherein the switching element includes a fixed contact mounted on a stationary member, a movable contact support formed from an elastic material and having one of two ends mounted on the stationary member and the other end on which a movable contact is secured to be operatively associated with the fixed contact, and a transmission member held on the movable contact support, and a support plate formed from an elastic material is further disposed in the hermetic casing of the thermal protector to be interposed between the transmission member and the thermally responsive element, the support plate having a spring constant lower than the movable contact support such that the support plate receives an elastic force via the transmission member from the movable contact support to apply the elastic force to the thermally responsive element so that the same is pushed against the inner wall of the casing.

20. A structure according to claim 2, wherein the switching element includes a fixed contact mounted on a stationary member, a movable contact support formed from an elastic material and having one of two ends mounted on the stationary member and the other end on which a movable contact is secured to be operatively associated with the fixed contact, and a transmission member held on the movable contact support, and a support plate formed from an elastic material is further disposed in the hermetic casing of the thermal protector to be interposed between the transmission member and the thermally responsive element, the support plate having a spring constant lower than the movable contact support such that the support plate receives an elastic force via the transmission member from the movable contact support to apply the elastic force to the thermally responsive element so that the same is pushed against the inner wall of the casing.

* * * * *